United States Patent [19]

Häuslein

[11] Patent Number: 5,071,549
[45] Date of Patent: Dec. 10, 1991

[54] JUG AND FILTER VESSEL FOR COFFEE OR TEA

[75] Inventor: Reinhard Häuslein, Minden, Fed. Rep. of Germany

[73] Assignee: Melitta-Werke Bentz & Sohn et al., Minden, Fed. Rep. of Germany

[21] Appl. No.: 399,569

[22] Filed: Aug. 24, 1989

[30] Foreign Application Priority Data

Sep. 2, 1988 [DE] Fed. Rep. of Germany ....... 3829865

[51] Int. Cl.$^5$ ........................................... B01D 29/085
[52] U.S. Cl. ..................................... 210/232; 210/469;
210/472; 210/474; 210/477; 210/497.3;
210/DIG. 17
[58] Field of Search ............... 210/232, 469, 472, 474,
210/477, 481, 482, 497.3, DIG. 17

[56] References Cited

U.S. PATENT DOCUMENTS

| | | | |
|---|---|---|---|
| 807,286 | 12/1905 | King | 210/474 |
| 1,032,917 | 7/1912 | Lynch | 210/474 |
| 1,060,100 | 4/1913 | King | 210/474 |
| 1,322,384 | 11/1919 | Willard | 210/474 |
| 2,172,031 | 9/1939 | Norman | 210/472 |
| 2,401,529 | 6/1946 | Varney et al. | 210/474 |
| 3,174,424 | 3/1965 | Serio | 210/474 |
| 4,689,147 | 8/1987 | Leoncavallo et al. | 210/474 |

FOREIGN PATENT DOCUMENTS

| | | | |
|---|---|---|---|
| 325236 | 1/1973 | Austria. | |
| 8200962 | 1/1982 | Fed. Rep. of Germany. | |
| 8321961 | 7/1983 | Fed. Rep. of Germany. | |
| 2167524 | 7/1987 | Japan | 210/474 |
| 833100 | 11/1957 | United Kingdom. | |

Primary Examiner—Robert A. Dawson
Assistant Examiner—Wanda L. Millard
Attorney, Agent, or Firm—Spencer & Frank

[57] ABSTRACT

A filtering device for coffee, tea or the like is composed of a jug, a jug opening having thread webs, and an approximately frustoconical filter vessel which includes a circumferential supporting ring having two mutually angularly offset thread groove segments for engaging the thread webs of the jug opening.

4 Claims, 2 Drawing Sheets

JUG AND FILTER VESSEL FOR COFFEE OR TEA

BACKGROUND OF THE INVENTION

The present invention relates to a filtering device for coffee, tea or the like comprising a jug equipped with a jug opening provided with thread webs and an approximately frustoconically configured filter vessel.

In order to brew coffee or tea, a filter vessel is placed onto the jug so that the finished coffee or tea flows directly into the jug. Particularly popular jugs for this purpose are insulated jugs. In such a jug an essentially cylindrical jug opening disposed in the neck of the jug is equipped with internal thread webs so that a closure can be screwed into the jug opening. The filter vessel used with the jug normally has a piece of filter paper inserted therein.

In this type of brewing, the filter vessel is often inadvertently pushed off the jug thus soiling the jug and its surroundings.

SUMMARY OF THE INVENTION

It is an object of the present invention to improve a filter device of the above mentioned type in a structurally simple manner so that if coffee or tea is brewed, the filter vessel cannot be dislodged from the jug. This is accomplished by providing the filter vessel with a circumferential supporting ring in its lower, outer region to which includes at least two thread groove segments which are angularly offset relative to one another and can be brought into engagement with thread webs in the jug opening.

The filter vessel may be screwed into the jug opening so that, during the brewing of coffee or tea, it is firmly connected with the jug. The securing of the filter vessel and its release after brewing can be accomplished in a particularly simple manner by means of the thread groove segments. The thread webs in the jug opening always extend over a relatively large angle and the imaginary continuation of the thread webs then results in a thread. Since the filter vessel is also provided with thread groove segments only, which are designed in such a way that they can be guided between the thread webs of the jug opening, securing and removing of the filter vessel is particularly easy since the angle of rotation is relatively small. In this connection it is preferable that the edge of the supporting ring associated with the jug opening, if the filter vessel is seated in the jug opening, be supported at an interior annular web in the jug opening. The coaction of the thread webs with the thread groove segments and the annular web produces a tension within certain limits so that, in a particularly advantageous manner, the filter vessel can be released only by force.

In order for air to be able to escape from the jug during brewing, a further feature of the invention provides that the supporting ring, which is supported on the annular web of the jug opening, includes at least one air escape opening.

The inner face of the supporting ring and the outer face of the wall defining the frustoconical area form an annular channel having a triangular cross section which is open toward the bottom. In order to prevent rinse water from collecting in this annular area when the filter vessel is put opening-down into a dishwasher, the wall defining the frustoconical interior of the filter vessel, where it is connected with the supporting ring, includes at least one rinse water drainage bore in the vicinity of the inner face of the supporting ring. To keep this bore closed by a filter paper inserted into the filter vessel during the brewing of coffee or tea, a compensating disc is provided for each rinse water drainage bore on the inside of the wall defining the frustoconical interior of the filter vessel, with the exposed surface of this compensating disc lying in the plane of reinforcing ribs.

Further characteristics and features of a preferred embodiment of the present invention are described in detail below.

DESCRIPTION OF THE PREFERRED EMBODIMENTS

Figure 1:
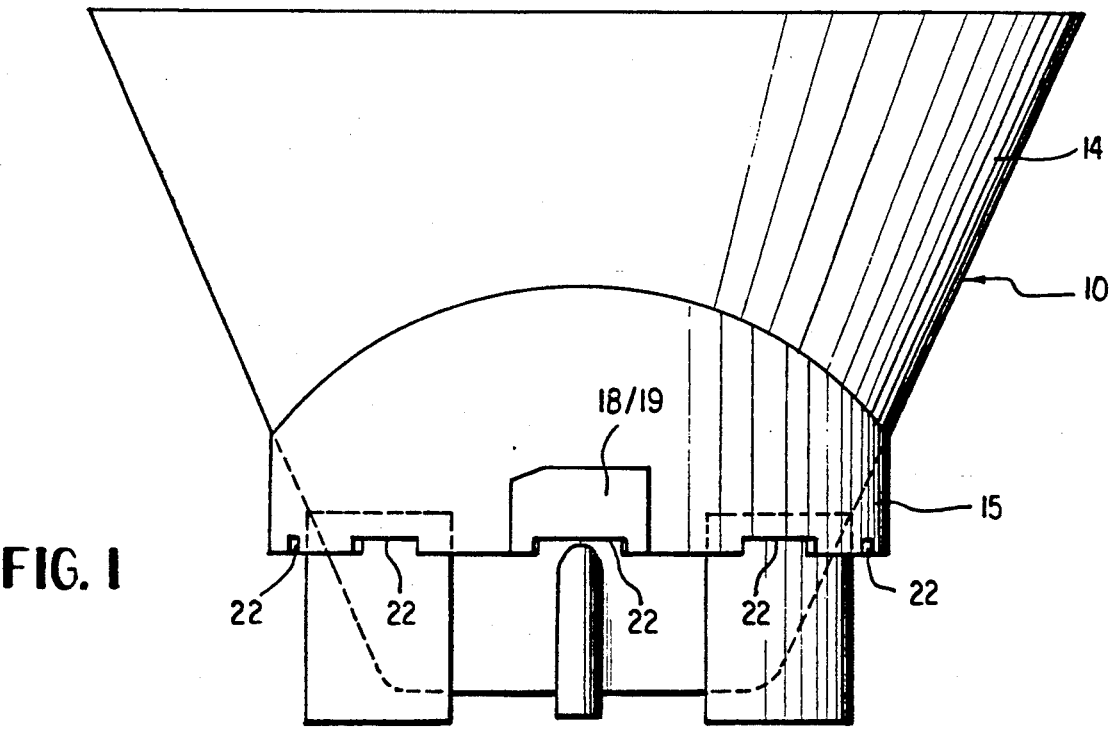
FIG. 1 is a front elevational view of the filter vessel of a filtering device.

The filter vessel marked generally with the numeral 10 in the drawing figures is screwed into the jug opening 11 of a jug 12. In the illustrated embodiment, jug 12 is a heat-retaining jug which includes an internal insulating insert 13. The filter vessel is configured in the generally known form essentially as a cone frustum and becomes wider toward its open upper end. In its lower region, i.e. the region facing jug 12, a circumferential supporting ring 15 is attached to the wall 14 of a filter vessel 10 defining the interior. Filter vessel 10 is configured in such a way that, in its lower region facing jug 12, it is configured as a triangular trough. The free frontal face of supporting ring 15 is set back relative to the lower end of filter vessel 10. Jug 12 is provided with two opposing thread webs 16 and 17 which project into jug opening 11. In the present embodiment, the central angle of each thread web 16 and 17 lies at about 90°. FIG. 2 shows that thread webs 16 and 17 are provided at a slight distance below the upper edge of jug 12. Two likewise opposing thread groove segments 18 and 19 are formed on the exterior of supporting ring 15. The outer diameter of supporting ring 1 is slightly less than the inner diameter of jug opening 11. Thread groove segments 18 and 19 are configured in such a manner that they can be brought into engagement with thread webs 16 and 17 projecting into jug opening 11. FIG. 2 shows that support ring 15 is designed in such a manner that, with thread webs 16 and 17 in engagement with thread groove segments 18 and 19, the free frontal face of supporting ring 15 lies against an annular web 20 which is offset in the direction toward the bottom of jug 12 relative to thread webs 16 and 17. An elastic seal 21 is supported by the other annular face of annular web 2 and extends over the upper edge of insulating insert 13. The section for the illustration of FIG. 2 is perpendicular to the plane of the drawing of FIG. 1.

Figure 2:
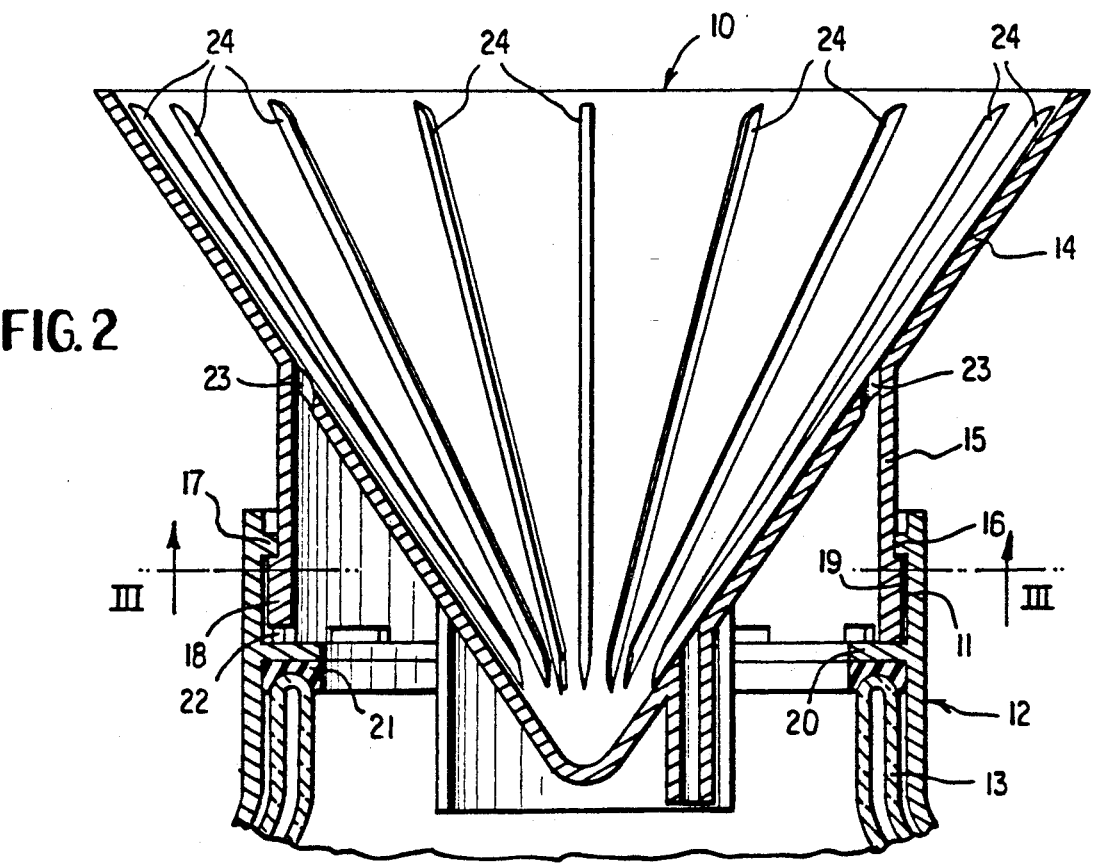
FIG. 2 is a vertical sectional view of a filter vessel fixed in the jug opening.
Figure 3:
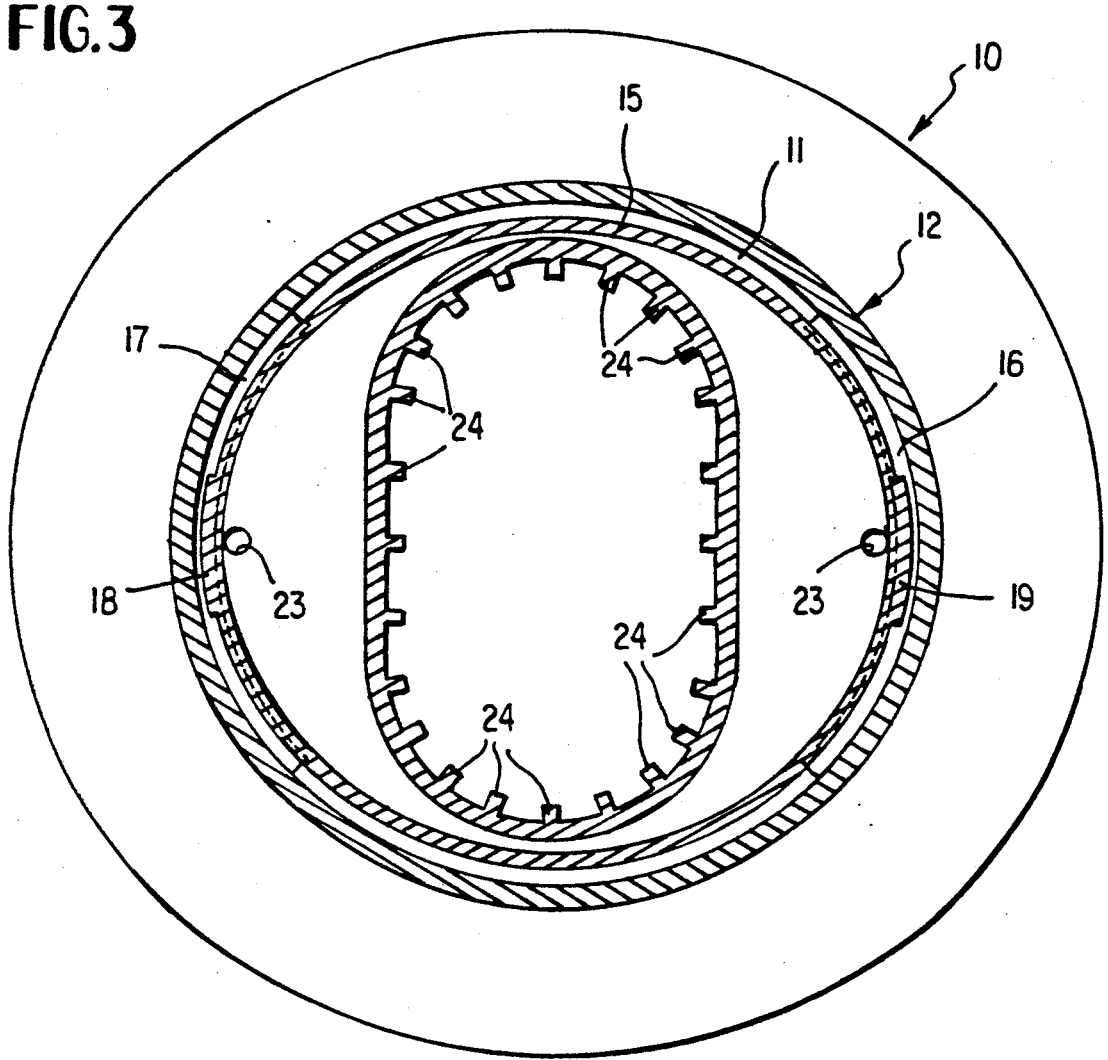
FIG. 3 is a sectional view seen along line III—III of FIG. 2.

To complete the filtering device, filter vessel 10, in the position shown in FIG. 1, is inserted into the jug opening 11 of jug 12 and then turned about an angle of about 90° so that the interaction of thread groove segments 18 and 19 with the thread webs 16 and 17 and placement of the free frontal face of supporting ring 15 on the associated annular face of annular web 20 produces a firm but releasable connection between jug opening 11 and filter vessel 10.

In order for air to be able to escape from the interior of jug 12 during the brewing of coffee or tea, supporting ring 15 is provided with several air escape openings which in the illustrated embodiment are recesses 22 in the free frontal face of supporting ring 15.

Figure 4:
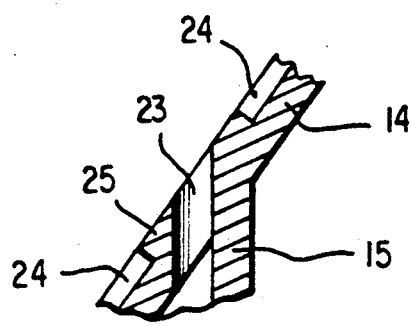
FIG. 4 is an enlarged sectional view of a detail.

The interior face of supporting ring 15 and the outer portion of wall 14 at the same height form an annular channel which has a triangular cross section and in which rinse water collects if filter vessel 10 is placed opening down into a dishwasher. To permit such water to drain out, two rinse water drainage bores 23 are provided in wall 14 directly adjacent to the interior face of supporting ring 15. Several reinforcing ribs 24 are included on the interior of wall 14 which to extend essentially transversely to the opening of filter vessel 10. During the brewing of coffee, a filter paper inserted into the interior of filter vessel 10 is supported on the free edges of reinforcing ribs 24. In order to prevent this filter paper insert from being excessively stressed in the region of rinse water drainage bores 23, a compensating disc 25 is included the wall. The exposed surface of this disc lies in the plane defined by the free edges of reinforcing ribs 25. Thus the filter paper insert is supported in the region of rinse water drainage bores 23. FIG. 4 is a detail view of this feature.

Instead of jug 12, some other vessel, for example a Thermos bottle, can also be employed. The important factor is that the jug opening has thread webs 16 and 17 which were originally intended for a screw closure.

FIG. 4 shows that compensating disc 25 lies between the mutually facing ends of the interrupted reinforcing rib 24, thus connecting the two parts of reinforcing rib 24 in a simple manner.

I claim:

1. A filtering device for coffee or tea comprising:
    a jug including a jug opening having thread webs; and
    an approximately frustoconical filter vessel having a lower exterior region including a circumferential supporting ring having two mutually angularly offset thread groove segments for engaging said thread webs of said jug opening, said filter vessel further having a frustoconical interior portion comprising a wall, said wall having a connecting region where said wall is connected to said supporting ring, said connecting region having at least one rinse water drainage bore which is disposed close to an interior face of said supporting ring.

2. The filtering device according to claim 1, wherein said wall includes two mutually oppositely disposed water drainage bores.

3. The filtering device according to claim 2 wherein said filter vessel includes interior reinforcing ribs extending transversely to said jug opening, said reinforcing ribs having free edges, and each said water drainage bore has an associated compensating disc attached to said wall comprising said frustoconical interior of said filter vessel, said compensating disc having a free face lying in a plane defined by free edges of said reinforcing ribs.

4. The filtering device according to claim 3, wherein each said compensating disc lies between facing ends of an interrupted reinforcing rib.

* * * * *